(12) United States Patent
Andersson et al.

(10) Patent No.: US 7,926,362 B2
(45) Date of Patent: Apr. 19, 2011

(54) METHOD AND A SYSTEM FOR DETERMINING A PLURALITY OF LOAD COMPONENTS ON A WHEEL

(75) Inventors: Lars Andersson, Solna (SE); Paul Sundvall, Johanneshov (SE); Maria Ögren, Stockholm (SE)

(73) Assignee: Interfleet Technology AB (SE)

( * ) Notice: Subject to any disclaimer, the term of this patent is extended or adjusted under 35 U.S.C. 154(b) by 102 days.

(21) Appl. No.: 11/921,346

(22) PCT Filed: May 30, 2006

(86) PCT No.: PCT/EP2006/062739
§ 371 (c)(1),
(2), (4) Date: Jan. 7, 2009

(87) PCT Pub. No.: WO2006/128878
PCT Pub. Date: Dec. 7, 2006

(65) Prior Publication Data
US 2009/0301221 A1    Dec. 10, 2009

(30) Foreign Application Priority Data
May 30, 2005    (SE) ...................................... 0501226

(51) Int. Cl.
*G01D 7/00*    (2006.01)
(52) U.S. Cl. ................................................. 73/862.041
(58) Field of Classification Search .................. 73/862.041–862.046
See application file for complete search history.

(56) References Cited

U.S. PATENT DOCUMENTS

| | | | | |
|---|---|---|---|---|
| 3,718,040 A | * | 2/1973 | Freeman et al. | 73/146 |
| 5,490,427 A | * | 2/1996 | Yee et al. | 73/767 |
| 5,894,094 A | * | 4/1999 | Kuchler et al. | 73/862.044 |
| 5,960,900 A | * | 10/1999 | Cheng | 180/165 |
| 5,969,268 A | | 10/1999 | Sommerfeld et al. | |
| 6,339,956 B1 | * | 1/2002 | Huinink et al. | 73/146 |
| 7,603,247 B2 | * | 10/2009 | Isono et al. | 702/116 |

FOREIGN PATENT DOCUMENTS

| | | |
|---|---|---|
| EP | 1225451 A1 | 7/2002 |
| EP | 1426259 A1 | 6/2004 |

OTHER PUBLICATIONS

"PCT Application No. PCT/EP2006/062739, International Search Report mailed Jul. 31, 2006", 5 pgs.
Otter, D. E., et al., "A Design for Next Generation Load Measuring Wheel Sets", *Proceedings of the 1991 IEEE/ASME Joint Railroad Conference*, (May 21-23, 1991, St. Louis, MO), (1991), 37-42.

* cited by examiner

*Primary Examiner* — Max Noori
(74) *Attorney, Agent, or Firm* — Schwegman, Lundberg & Woessner, P.A.

(57) ABSTRACT

The invention relates to a method and a system or determining a plurality of load components ($F_i$) on a wheel, comprising the steps of providing on the wheel a plurality of sensors ($g_j$) with which it is possible to detect strains or stresses, and measuring essentially simultaneously sensor values ($\epsilon_j$) of at least some of the sensors ($g_j$). The invention is characterised in that the number of sensors ($g_j$), sensor values ($\epsilon_j$) of which are measured essentially simultaneously, is at least three, and in that the method comprises the step of determining a plurality of load components ($F_i$) at least partly based on the measured sensor values ($\epsilon_j$).

27 Claims, 8 Drawing Sheets

METHOD AND A SYSTEM FOR DETERMINING A PLURALITY OF LOAD COMPONENTS ON A WHEEL

RELATED APPLICATIONS

This application is a nationalization under 35 U.S.C. 371 of PCT/EP2006/062739, filed May 30, 2006 and published as WO 2006/128878 A1 on Dec. 7, 2006, which claimed priority under 35 U.S.C. 119 to Swedish Patent Application Ser. No. 0501226-5, filed May 30, 2005; which applications and publication are incorporated herein by reference and made a part hereof.

TECHNICAL FIELD

The invention relates to a method and a system for determining a plurality of load components on a wheel.

BACKGROUND

A number of methods have been suggested for determining loads acting on a train wheel.

An often used method comprises equipping each wheel with strain gauge arrangements called Wheatstone bridges. Two such bridges are provided for the vertical force and one bridge is provided for the lateral force. The signals are decoupled based on the placement of the strain gauges. The signal conditioning equipment is located on board and connected to the wheel via a slip ring device. Since the vertical force is not measured directly, a piece of analogue hardware, a 'Q-shaper', is used to obtain the force from the measured signals. A number of disadvantages are connected to this method. The wheels must have curved web to obtain separation of the lateral and vertical track forces. This means that specially manufactured wheels have to be provided for the test. Further, the in- as well as the outside of the wheel disc has to be instrumented. This means that the wheel discs have to be provided with holes to transfer the signal between the in- and outside. Such operations may compromise the structural integrity of the wheel, shorten its life, and render it un-useful for normal operation after the tests are finalised.

Further known method for determining train wheel loads can be found in, for example, DE3114499A1 and EP580969A1.

DE1079348 describes a method in which two strain gauges are placed on a train wheel, one on each side thereof, and opposite to each other. Calibration values corresponding to relationships between strains and wheel angles are established for the strain gauges at vertical and side loads. Two equations with relationships between measured strains, the calibration values and true loads are provided. Although one embodiment suggests the use of additional strain gauge pairs for a sequential provision of measured values, at any given point in time only two strain gauges, located at the same radial and angular location (in angular coordinates) of the wheel, are used to calculate the loads. This results in the system being sensitive to interference, and noise levels, resulting in a risk of erroneous results. Further, as in the solution described above, the in- as well as the outside of the wheel disc has to be instrumented, resulting in the need for structurally detrimental operations on the wheel.

In general, in most known methods, the output from the gauges will generally be a combination of all features present in the wheel and in the electrical system used to measure it, as well as disturbances. In general, regarding each load to be determined, there is a need to improve the separation of measurements belonging to this load from the rest of the signals.

SUMMARY

It is an object of the invention to provide a wheel load testing method, that is easy to perform, and that gives dependable results regarding loads to be determined.

It is also an object of the invention to provide a wheel load testing method that can be performed using a wheel of any known type without structurally detrimental operations having to be performed on the wheel.

It is also an object of the invention to provide a wheel load testing method that has a low sensibility to signal interference.

These object are reached with a method for determining a plurality of load components, $F_i$, on a wheel, comprising the steps of providing on the wheel a plurality of sensors with which it is possible to detect strains or stresses, and measuring essentially simultaneously sensor values, $\epsilon_j$, of at least some of the sensors.

The invention is characterised in that the number of sensors, the sensor values of which are measured essentially simultaneously, is at least three, and in that the method comprises the step of determining a plurality of load components ($F_i$) at least partly based on the measured sensor values ($\epsilon_j$).

The wording "measuring essentially simultaneously" means in this case that values are obtained from a number of sensors such that the rotation of the wheel from the time at which the first value is obtained to the time at which the last value is obtained has a maximum value. Preferably, the wheel rotates no more than 30 degrees from the time at which the first value is obtained to the time at which the last value is obtained. This will provide information that could be useful for determining the load components. If the wheel rotates no more than 15 degrees from the time at which the first value is obtained to the time at which the last value is obtained, the usefulness of the information will be higher. For dependable results, the wheel should not rotate more than 5 degrees from the time at which the first value is obtained to the time at which the last value is obtained.

By measuring essentially simultaneously sensor values of at least three sensors at different angular locations of the wheel, an "image" of the strain field in the wheel can be obtained. This will provide a dependable base for determination of the load components. Further, since measurement values are obtained from a plurality of angular and/or radial locations of the wheel, values that are too low to be useful in known solutions, can be used in the inventive technique. Also, the inventive technique does not need specially designed test wheels for obtaining larger measurement values.

One problem specifically that has been encountered using known measurement technology is that, in connection to the load components acting at the contact point between the wheel and the rail, generally being the ones most relevant to measure, strains or stresses in the wheel coming from loads such as rotation and temperature are hard or impossible to separate from the loads of interest. These therefore often generate errors. In the inventive technique, in the general case, these loads can with a suitable sensor placement be measured and well separated from each other as well as from the contact-point-loads. In the case where all sensors are placed on the same radius, the rotationally symmetric loads can obviously not be separated from each other, but they can still be separated from the forces at the wheel-rail contact point.

Also the case of quasi-static loads, without any assumptions of rotational symmetry, can be handled within the scope of the invention. Such loads can be equipment offsets due to imperfect manufacturing of equipment or imperfect mounting of the equipment on the wheel, inhomogeneous temperature loads (if for example the sun has been shining on only a part of the wheel) etc.

Known measurement technologies require very good precision in attaching sensors to the wheel, which causes time and resource consumption as each sensor must often be attached to the wheel several times before it is considered to be well enough placed. If the accuracy is not kept, unacceptable errors are introduced to the system. With the invention the sensor placement accuracy needs to be sufficient only to a level at which the sensors are placed in a way that captures the strain fields from the loads satisfactorily. As described above, also inhomogeneous, quasi-static loads can be handled. Further, the inventive technique does not require that all sensors capture the same amount of each load.

Preferably, the step of determining a plurality of load components comprises determining a load component determination matrix, herein called B, such that a load component vector, F, with the load components, equals or is well approximated by the product of the load component determination matrix and a sensor value vector, $\epsilon$, with the measured sensor values.

Among other thing, this will facilitate handling of quasi-static loads, without any assumptions of rotational symmetry, loads due to imperfect manufacturing of equipment or imperfect mounting of the equipment on the wheel, inhomogeneous temperature loads, etc. Specifically, such loads can easily be handled as independent strain fields, introduced in the computation of the B matrix.

Preferably, the load component determination matrix is chosen so that $F=B\epsilon$ is the least-squares solution to the overdetermined linear equations system of $\epsilon=AF$, where the matrix A contains sensor values related to individual load components.

The matrix A could contain a plurality of sensor calibration values, $A_{ji}$, each related to a specific calibration load, $F_{ic}$. In case the number of sensors, sensor values of which are measured essentially simultaneously, is larger than the number of load components, the least-squares solution gives a good approximate solution to the relationship between the sensor values and the load components.

More specifically, in case calibration values are used, establishing a relationship between a plurality of sensor calibration values, $A_{ji}$, and a plurality of calibration loads, $F_{ic}$, can comprise establishing a plurality of calibration loads, $F_{ic}$, each corresponding a respective load component, $F_i$, and determining, for each of a plurality of combinations of a sensor and a calibration load, $F_{ic}$, a sensor calibration value, $A_{ji}$, depending on the angular position of the wheel. Thereupon a sensor value determination matrix, A, with the sensor calibration values, $A_{ji}$, is determined such that the sensor vector, $\epsilon$, equals the product of the sensor value determination matrix, A, and the load component vector F, i.e. $\epsilon=A*F$. This relationship, that may have more equations than unknown parameters, is, according to the preferred embodiment of the invention, solved with a least squares approximation method. This means that the step of determining a load component determination matrix B, such that $F=B*\epsilon$, is done by determining B as $(A^T*A)^{-1}*A^T$.

The load components can be of any number and of any observable type, for example vertical forces or horizontal forces, or force moments from the contact between the wheel and a train rail or a road, centrifugal loads, temperature stresses, eigenvibrations of the wheel, etc.

In the detailed description below, reference is made to a train wheel, but the invention is equally applicable for determining forces acting on any other type of vehicle wheel, for example a wheel on a heavy vehicle such as a truck or lorry.

The sensors can be of any suitable type for obtaining information about stresses or strains, for example strain gauges, or a combination of strain gauges, e.g. in the form of half bridges or full bridges. A sensor, as understood here, can have, for example in the case of a full bridge, a physical extension so as to cover a part of the wheel surface. Nevertheless, this extension is small in relation to the area of the wheel disc.

Preferably, the wheel angle, at which the step of measuring the sensor values, $\epsilon_j$, was taken, is determined at least partly on the basis of the measured sensor values, $\epsilon_j$, and the calibrations sensor values $A_{ji}$. This means that the wheel angle can be determined based on the measures sensor values, and that no special equipment is needed to detect the wheel angle during the testing. Preferably, the wheel angle is determined as the value that minimises the expression $|\epsilon-A*B*\epsilon|$, where A is a sensor value determination matrix with the sensor calibration values, $A_{ji}$.

Preferably, the number of sensors is at least eight. This will most likely provide results that are dependable for most wheel types. In particular, a large number of sensors result in less noise. In addition, a large number of sensors will provide a better use of the strain field variety over the wheel. Especially since wheels of different types present different strain fields when subjected to identical loads, the large number of sensors will provide an effective adaptation to different wheel types.

Preferably, all sensors are provided on the same side of the wheel. This means that there is no need to machine holes in the wheel or the axle thereof to provide for running wires from strain gauges mounted on a side of the wheel that is opposite to a signal receiving device.

Preferably, at least one sensor comprises two sensor elements, whereby one sensor element is oriented in the radial direction of the wheel, and the other is oriented in the circumferential direction. This gives a possibility to easily measure the strain in the radial and circumferential direction on the same location, and will also provide less offset due to temperature variations.

Preferably, at least some of the sensors are provided along a circle, the centre of which essentially coincides with the wheel centre.

Preferably, at least some of the sensors are connected to an electrical device at the wheel axle, the electrical device comprising a radio unit, the method comprising the step of transmitting information at least partly based on the sensor values to a radio receiver.

The objects above are also reached with a system according to any of the claims 11-23.

DESCRIPTION OF THE FIGURES

Below, the invention will be described closer with the aid of the drawings, in which.

DETAILED DESCRIPTION

Figure 1:
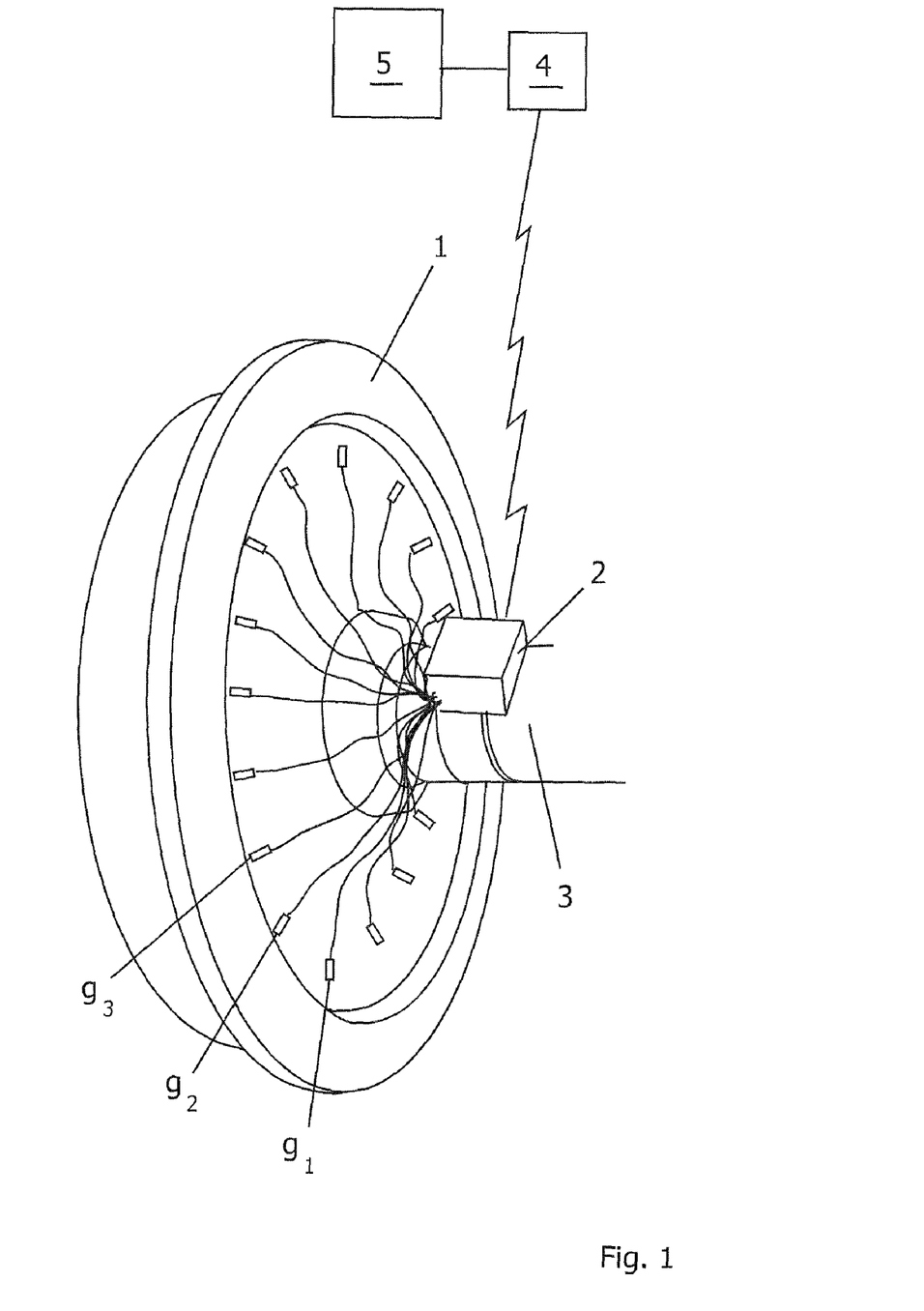
FIG. 1 shows schematically a train wheel and a part of an axle therefore, and a system for determining a plurality of load components, according to one embodiment of the invention, FIG. 2 a part of the system in FIG. 1.

FIG. 1 shows a system for determining a plurality of load components on a train wheel 1. The system comprises a plurality of sensors ($g_1, g_2, g_3 \ldots$), and an electronic device 2. The plurality of sensors ($g_1, g_2, g_3 \ldots$), (herein also collectively referred to as $g_j$), in this example twenty four, are each provided in the form of a half bridge comprising two strain gauges. All sensors are mounted on one side of the wheel disc, in this case on the inside. Alternatively, the sensors can be mounted on the outside of the wheel. The choice between the inside and the outside of the wheel can be based upon such considerations as space availability and strain levels. Further, more or less than twenty four sensors can be used.

The sensors $g_j$ are connected via electrical wires to the electronic device 2 mounted on the wheel axle 3. As is described further below, in the device 2, signal conditioning is made and the signal is passed on in digital form to the rest of the measurement system via a wireless connection, or via slip rings. Preferably, one electronic device is provided for each instrumented wheel disc. Alternatively, two wheel discs on an axle can be connected with cables, only one electronic device, can be provided per wheelset. As described further below, where several wheels are provided with strain gauges, a plurality of electronic devices can share access to a single or multiple receiver antenna(s) mounted on the train.

Figure 2:
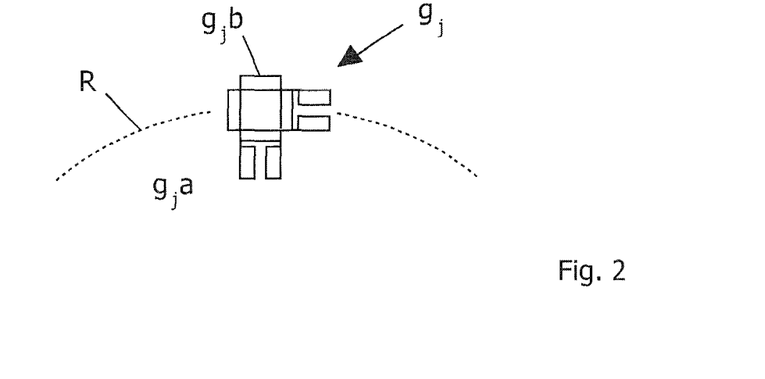

Referring to FIG. 2, a constant radius line R on the wheel 1 is indicated with a broken line. Preferably, two strain gauges $g_j a$, $g_j b$ are connected in the form of a half bridge, whereby one strain gauge $g_j b$ is oriented in the radial direction of the wheel, and the other $g_j a$ is oriented in the circumferential direction. This gives a possibility to easily measure the strain in the radial and circumferential direction on the same location. It is however possible to measure the strain using only a single strain gauge, a full bridge (four strain-gauges) or other strain measuring devices. In particular, for the implementation of the invention it is not necessary to measure strains in more than one direction, or even in the same direction for all sensors. Further, the sensors can be provided on the same radial distance, or on different radial distances on the wheel.

Figure 3:
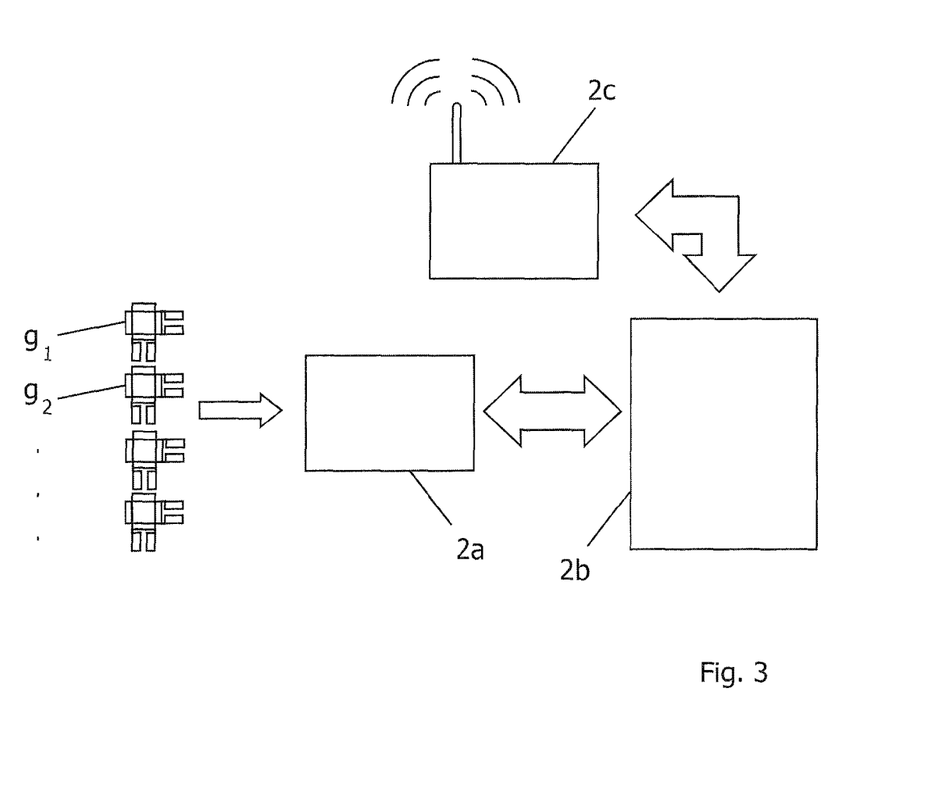
FIG. 3 shows a block diagram of a part of the system in FIG. 1.

Referring to FIG. 3, the electronic device 2 comprises a signal conditioner 2a, a digital signal processor 2b and a radio unit 2c. The signal conditioner 2a can be a time to digital converter, analogue to digital converter or of some other suitable type. It is connected to the strain gauges via wires. In operation, the strain gauge values are sampled, for example with predetermined time intervals with a frequency that is at least twice as high as the highest natural frequency of the wheel. Alternatively, sampling can be done with irregular time intervals (so called random sampling).

Signals from the signal conditioner 2a are sent via wires to the digital signal processor 2b, which is adapted to modify the signals in order to make practical transfer of the signal from the radio unit 2c possible. For example, the digital signal processor 2b can comprise different forms of compressions for data reduction and accuracy increasing actions. Signals from the digital signal processor 2b are sent via wires to the radio unit 2c, which transmits them to a radio receiver 4 (see FIG. 1), preferably on board the train on which the wheel 1 is provided.

Figure 5:
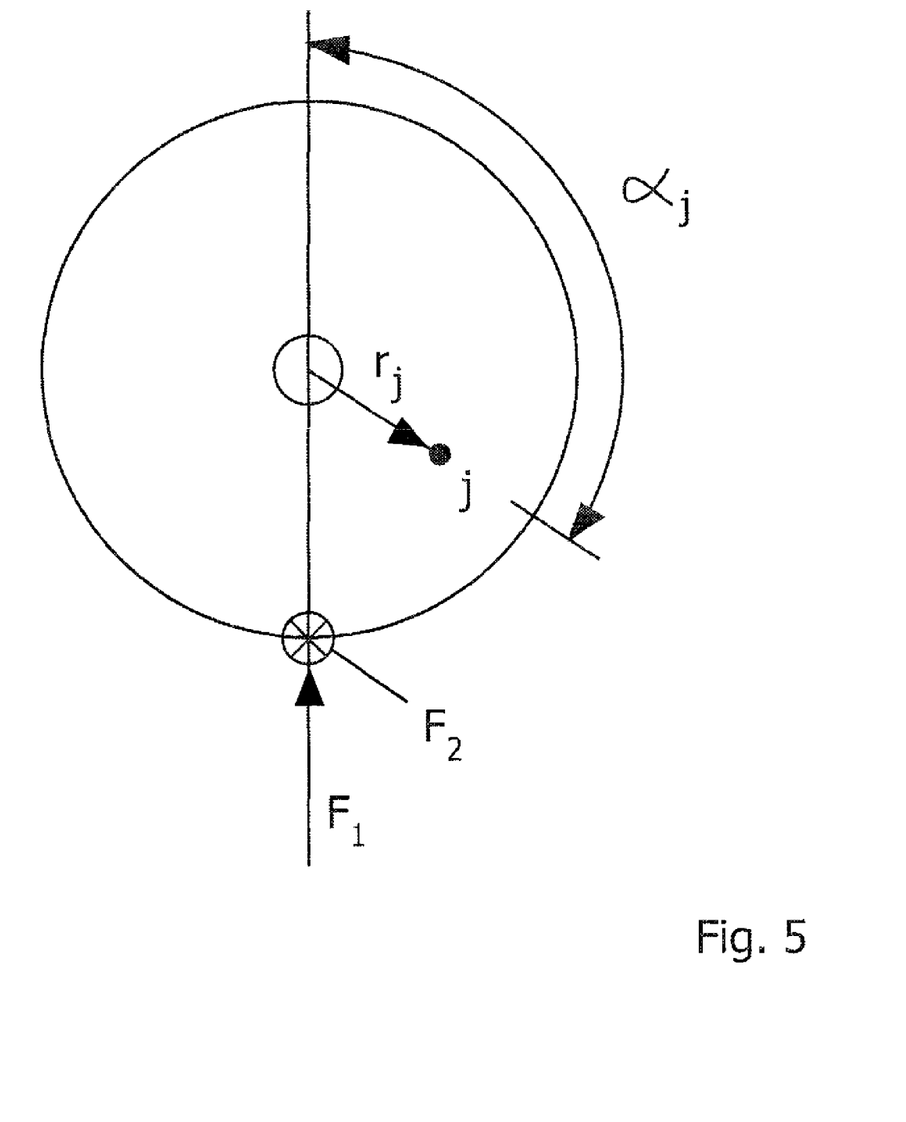
FIGS. 5 and 6 show schematic plan views of wheels.

Referring to FIG. 1, the signals are received by the radio receiver 4 from the radio unit 2c in the electronic device 2, and then sent to a computation device 5 for calculation of the load components. Alternatively, referring to FIG. 4, the electronic device 2 comprises a computation device 5, for example identical to the digital signal processor 2b, which is adapted to calculate the load components, whereupon information about the latter are sent over the radio link to the radio receiver 4. The load components acting on the wheel are calculated by means of the following method steps:

In FIG. 5, only two forces $F_1$, $F_2$, herein also referred to as load components or loads, are to be determined, one of them $F_1$ being a vertical force from the train rail, and the other $F_2$ being a horizontal force. However, the invention can be used to analyse more than two forces acting on the wheel 1. Herein, the forces or load components are also referred to collectively as $F_i$.

Referring to FIG. 5, a specific force $F_i$ is assumed to give a specific strain field over the wheel 1. The size of the strain field in each point j, (the location of which is here given with coordinates $(r_j, \alpha_j)$ as indicated in FIG. 5, these coordinates referring to a wheel fixed coordinate system), is assumed to be a linear function of the size of the force $F_i$ applied, and the strain fields from different forces $F_1$, $F_2$ are assumed to be linearly additive. This means that the strain in a specific point $\epsilon_{tot}(r_j, \alpha_j)$ on the surface of the wheel can be written as $$\varepsilon_{tot}(r_j, \alpha_j) = \sum_i F_i \varepsilon_i(r_j, \alpha_j) \quad \text{(Equation 1)}$$

where $F_i$ is the size of load number i, and $\epsilon_i(r_j, \alpha_j)$ describes the strain per load unit in the point $(r_j, \alpha_j)$ for load number i.

Further, the above described strain fields are assumed to be linearly separable. This means that there is at least one set of points $\lfloor (r_j, \alpha_j) \rfloor$ such that the set of equations in the form of equation 1 for these points with given values of $\epsilon_{tot}(r_j, \alpha_j)$ and $\epsilon_i$ define uniquely the corresponding $F_i$, and that for each i, there is a vector $B_i$, such that $F_i$ is given by equation 2 below (where $\epsilon_{tot}$ is a vector for all the points $(r_j, \alpha_j)$ in the set, describing the total strain in each such point).

$$F_i = B_i \epsilon_{tot} \quad \text{(Equation 2)}$$

Since $\epsilon_{tot}$ can be measured, if $B_i$ can be found, the loads $F_i$ can be determined.

According to the assumptions above, it is possible to perform a calibration where different loads of known sizes are applied separately to the wheel, and the strains due to each such load are registered and stored.

Strain gauges are thus mounted on the wheel in some well chosen positions, for example as sketched in FIG. 1, and the calibration is performed as described, resulting in the matrix A, which contains the load specific strain-per-load fields, $\epsilon_i$, from equation 1. A relates the total strain in the given points (the vector $\epsilon_{tot}$) to a combination of applied loads (vector F) according to:

$$\epsilon_{tot} = AF \qquad \text{(Equation 3)}$$

As stated above, we have (from calibration) a matrix A that fulfils equation 3. We want B such that $$F = B\epsilon_{tot} \qquad \text{(Equation 4)}$$

which is equivalent to $$BA = I \qquad \text{(Equation 5)}$$

Since, in the typical case, $\epsilon_{tot}$ has several more dimensions than F, the system is over determined and equation 5 has an infinite number of solutions. These solutions can be written on the form $$B = B^0 + wN \qquad \text{(Equation 6)}$$

where $B^0$ is one solution to equation 6, $N^T$ is the nullity of $A^T$, and w are weights that can be chosen arbitrarily. We choose $B^0$ to be the pseudo inverse of A. Choosing $B^0$ to be the pseudo inverse of A means $$B^0 = (A^T A)^{-1} A^T \qquad \text{(Equation 7)}$$

Obviously, this choice of $B^0$ satisfies equation 6, as requested. By definition, the rows of $B^0$ are also orthogonal to all columns of A except one. Further, this choice of $B^0$ is well conditioned, and corresponds to a least squares approximation of the problem.

w can be chosen so that it is non-identical to zero. The larger w gets, the more sensitive the method will be to noise in the system. Although a small w can probably be handled, preferably w≡0. $B^0$ as described above shows a set of very attractive features. Further, any choice of w of equation 6 except for w≡0 would add vectors to B that by definition are in the nullity of $A^T$, which means projection onto them does not capture any features of A. Therefore we choose w≡0, which means $B \equiv B_0$.

Since the strain field varies with angular position of the applied load, the wheel angle must be determined to be able to measure the loads correctly. This can be done with a sensor providing information corresponding to the wheel angle, which information can be coordinated with the strain gauge information.

However, preferably the wheel angle can be determined by use of the following method: The method uses the assumption that if the loads are estimated from a strain field, and subsequently the expected strain field is computed from the loads, the difference between the computed strain field and the measured one is at a minimum at the right angular wheel position.

In mathematical terms, the assumption above can be formulated as follows: We assume that the error, e, as given by the expression $$e(\phi) = |\epsilon(\phi_0) - A(\phi)B(\phi)\epsilon(\phi_0)| \qquad \text{(Equation 8)}$$

assumes minimum when $\phi = \phi_0$, i.e.

$$\min_\varphi e(\varphi) = e(\varphi = \varphi_0) \qquad \text{(Equation 9)}$$

The wheel angle gives the rotational location of the wheel, i.e. the rotation around the wheel axle, and therefore $\phi$ and $\phi_0$ refers to a vehicle fixed coordinate system. In the equations 8 and 9, $\phi_0$ notes the true wheel angle. $\epsilon(\phi)$, $A(\phi)$, and $B(\phi)$ follow the notations of previous sections, with the addition of angular dependence.

Preferably, the search for minimum value according to equation 8 is done in two steps, first finding a coarse estimate, then performing a closer search in a small neighbourhood to the coarse estimate. A coarse estimation can be given by an external device, or on the basis of the angle at the previous measurement, the train speed, and the time between measurements. In the latter case, the speed may either be computed or received as input from an external source.

If none of these estimations is available, which may be the case all the time, or only in some unfortunate cases when disturbances has caused the system to 'lose track', the angle must be found "from scratch". For these cases, it can be assumed that computations of e for a certain number of angles around the lap will result in a coarse estimation corresponding to the above. In other words, for the coarse estimation it is assumed that there is an angle interval around minimum e where all values of e are lower than all values of e outside this interval. Thereby, computations using equation 8 are made for a large amount of angles around the entire lap of the wheel, and the angle minimum value of these computations is chosen as the coarse approximation of the angle.

To improve the estimation, a search can be made in the neighbourhood of the coarsely approximated angle in an efficient way to find the minimum of the function. This is done for example with a suitable iterative method, or with some smooth curve approximation.

Above, a preferred embodiment has been described, and below further advantages of the invention will be pointed out. Obviously, using the inventive method any set of linearly separable strain fields can be distinguished from each other and recognized.

A common application for methods in the technical field of the invention is a wheel that is externally affected mainly by its contact to what it is rolling on, for example the ground or, in the case of a train wheel, the rail. For a rail vehicle, therefore, the main source for non-symmetric loads is the contact forces at the wheel—rail contact point or points. The force may vary in direction, and the application point may vary angularly as the wheel turns, but may also vary in the direction parallel to the wheel axis. Further, there may be two contact points, for example one on the flange of the wheel, and one on the running surface.

The contact point can vary along the direction parallel to the wheel axis, and the applied force may vary in size and direction. As it varies, the strains in the wheel vary.

As has been suggested above, to be able to measure strength and direction of the force, the latter can be described using linearly separable load components. Thereby, each load component can be measured by the strain field it causes in the wheel. Where the force is expected to vary in all three spatial dimensions, it can be described by three load components, for example in an orthogonal coordinates' system.

Figure 6:
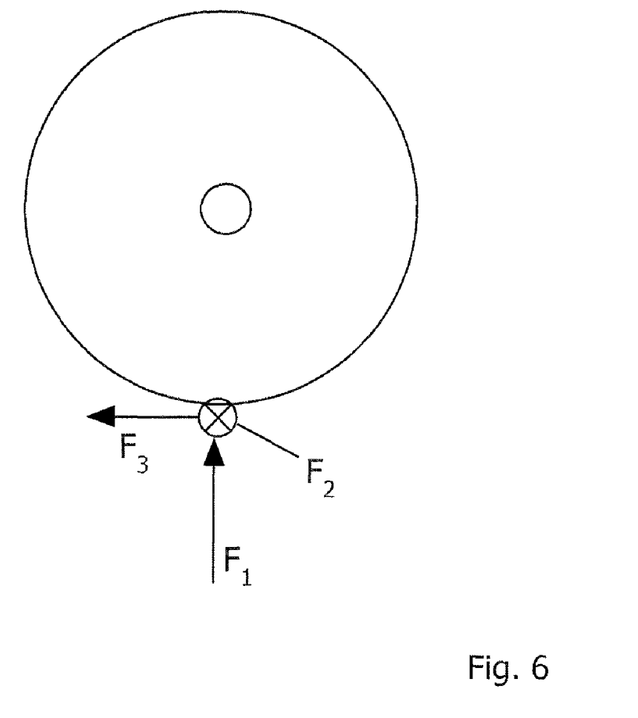

Referring to FIG. 6, the three load components may for example be the following: one vertical load component $F_1$, one load component $F_2$ parallel to the wheel axle, and one load component $F_3$ perpendicular to the previous two (approximately aligned with the rail). If the load is expected to vary only in the directions of $F_1$ and $F_2$, $F_3$ does not have to be represented.

Figure 7:
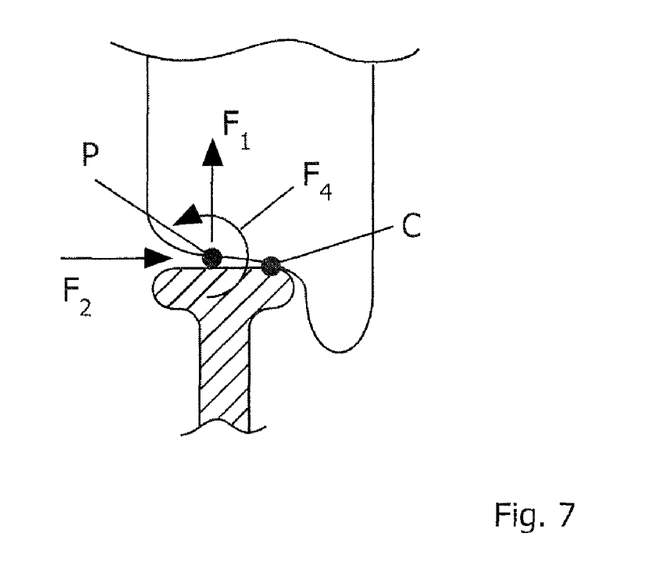
FIG. 7 shows a part of the wheel in FIG. 6, viewed in a direction perpendicular to its rotational axis, and a part of a cross-section of a train rail.

Further, the case where the contact point between wheel and rail (i.e. the point where the load is applied) is translated along the wheel surface parallel to the wheel axle can be described by introducing an extra load component. Referring to FIG. 7, in a case with such a translation, preferably the vertical $F_1$ and the sideways acting $F_2$ load component are assumed to act at a point P at the wheel periphery. The effect of a real force acting at a point C at a distance from the point P is taken into account by a moment $F_4$ acting around P. For each of the load components including the moment $F_4$, a separate strain field can be detected, and measured.

Using the moment $F_4$ explicitly is not necessary, though. An alternative is for example to introduce instead of the moment an extra force component, acting on the wheel in another position, and directed so that it does not pass through the point where other load components intersect. The translation can then be computed from the proportions of the different loads that are measured.

Obviously any force component/moment combination that is mechanically equivalent to the above can be used as well.

As described above, to be able to measure loads on the wheel, a relation between measured strain values and applied loads must be established. This can be done in several different ways. One way is to apply, as mentioned above, unit loads in the directions chosen for measurement, which would give the matrix A for these loads directly.

It is also possible to apply loads that are combinations of the unit loads, and then compute, from the sensor measurement results, the strain responses for the unit loads. Thereby, when using the embodiment described with reference to FIG. 7, the moment $F_4$ would still have to be calibrated using a displaced version of one of the forces as it is difficult to apply the moment separately.

In the examples above, calibration is performed resulting in the matrix A, which contains the load specific strain-per-load fields, $\epsilon_i$. An alternative to this is to calibrate using running loads. The main variations in strain or stress vectors can be identified as follows:

Let the matrix M contain the elements $M_{i,j}$ corresponding to the value of sensor number i at instant number j. For simplicity, assume that all the measurements are collected at the same angle. (If they are not, the first thing to do is to sort the measurements into different vectors corresponding to different angles, then proceeding as below.) The number of measurement instants must be large, and all loads must have been varied during the test. Now, generate the matrix $$C = \sum_j M_{:,j} * M_{:,j}^T$$

The eigenvectors of this matrix will correspond to the main variations in strain sample vectors. The corresponding eigenvalues will describe the amount of variation along each eigenvector. The linear relation between the strain field and the applied load can then be decided by an extra, static calibration.

In a more generic case, the invention could be used without previous calibration. If the wheel is used in the environment or situation for which one wants to test it, and all signals from all sensors during the testing session are logged, the main strain fields that reappear frequently during the test can be extracted by finding the eigenvectors of the data after the test as explained above. These eigenvectors can then be associated with different phenomena, for example by attempting to reproduce them in a rig, or by identification of what phenomena were observable by other methods when different eigenvectors occurred. The eigenvectors are not identical to the B matrix, but the B matrix can be computed from them. Using this procedure, the B matrix can be computed without previous calibration in a rig, (although to get a correlation between size of the loads and output from the sensors, some correlation to known loads must be made). It is also possible to identify previously unknown strain or stress fields that may not be predictable or easily generated under calibration circumstances.

Above, a procedure for determining the wheel angle has been described. An alternative wheel angle determination procedure can be as follows: In the procedure it is assumed either that all loads applied to the wheel result in strain or stress fields symmetric relative a vertical line through the rail contact point, or that all loads applied to the wheel result in strain or stress fields anti-symmetric relative that same line. Symmetric loads according to the above are for example vertical and lateral (parallel to the wheel axle) force components acting in the contact point, and the force moment caused by lateral displacement of the rail contact point. Anti-symmetric loads are for example longitudinal loads (parallel to the rail), such as brake or acceleration forces.

Further, it is assumed in the alternative wheel angle determination procedure that there is a subset, S, of the sensors, such that the sensors in S are placed in a circle centred on the wheel, with equal distance between each consecutive pair of sensors within S.

Additionally, all sensors in S must be placed so that they capture either no shear strain or stress, or only shear strain or stress. They must all capture the same strain or stress component (in angular coordinates). For example, if one sensor captures pure radial strain, all others must capture pure radial strain, too.

Now, consider $\epsilon^S$ defined as follows:

If the strain or stress field is symmetric as described above and the sensors in S measure no shear strain or stress, or if the strain or stress field is anti-symmetric and the sensors measure pure shear strain or stress, $\epsilon^S$ contains the strain or stress values measured.

If the strain or stress field is symmetric as described above and the sensors in S measure pure shear strain or stress, or if the strain or stress field is anti-symmetric and the sensors measure no shear strain or stress, $\epsilon^S$ contains the absolute value of the strain or stress values measured.

Now, the wheel angle can be found by finding the symmetry in the vector $\epsilon^S$. In the below equation, $\epsilon^S$ has n elements. The indices of $\epsilon^S$ should be considered modulo n, which means that they are cyclical so that the index a indicates the same element as the index n+a for any number a. Define a symmetry function, y as $$y(i) = \sum_{k=1}^{n/2} \epsilon^S_{i+k-1} \epsilon^S_{i-k}$$

If we find the $i=i_{max}$ that maximizes y(i) according to the above, we know that the symmetry line passes between sensors number $i_{max}-1$ and $i_{max}$.

Assuming the sensors not to be infinitely close, this of course renders quite a coarse estimation. A better estimation is found if the following computations are made:

In addition to the above, the value $i_{steep}$ that maximizes the difference abs(y(i−1)−y(i)) is found. Interpolation, for example linear interpolation, is then used to find the value corresponding to a non-existing sensor, $i_1$, placed right between sensors number $i_{steep}$ and $i_{steep}-1$. In the case of linear interpolation therefore, $y(i_1)=(y(i_{steep})+y(i_{steep}-1))/2$. Using again interpolation, the same value can (for symmetry reasons) be found corresponding to another non-existent sensor, $i_2$, in the neighbourhood of sensor number $2i_{max}-i_{steep}$. The interpolation will result in a decimal $i_2$, corresponding to a position somewhere between existing sensors, but probably not right between two sensors.

A good approximation to the position of the symmetry line is the angle right between the two thought sensors $i_1$ and $i_2$.

The angular position of the contact point is now determined to be on the symmetry line, which means one of two positions on the wheel, the other position being separated from the contact point by 180°. To choose the right one of these points, some additional knowledge must be used.

For example, the fact that the sum of absolute strain or stress values over the half of the lap closest to the contact point is larger than the sum of the strain or stress values on the other half can be used.

Or, if previous angles are known, and it is likely that the angular speed of the wheel is close to constant, the approximate new position of the contact point can be computed, and compared to the above result.

An aspect of the invention relates to "measuring essentially simultaneously" for obtaining sensor values from plural sensors $g_j$, i.e. obtaining sensor values from more than one of the sensors $g_j$. By measuring essentially simultaneously sensor values of at least three sensors at different angular locations of the wheel, a momentary "image" of the strain field in the wheel can be obtained. This will provide a dependable base for determination of the load components. The wording "measuring essentially simultaneously" means in this case a measurement occasion, or sampling occasion, at which values are obtained from a number of sensors. In other words, plural sensors are sampled essentially simultaneously to collect measurement signal samples. This sampling may be repeated with a certain sampling frequency so as to obtain a series of momentary "images" of the strain field in the wheel.

It is to be understood that a momentary "image" of the strain field in the wheel obtained from the collected measurement signal samples obtained at one sampling occasion is believed to have a highest quality if all the sensor values are collected at exactly the same point in time. According to a preferred embodiment each such "image" is obtained by reading the sensor values from plural sensors $g_j$ at the exact same time. However, as described above, useful results can be achieved also if sensor values are read at slightly different time points, as long as all the sensor values are obtained "essentially simultaneously". Preferably, the wheel rotates no more than 30 degrees from the time at which the first value is obtained to the time at which the last value is obtained. This will provide information that could be useful for determining the load components. If the wheel rotates no more than 15 degrees from the time at which the first value is obtained to the time at which the last value is obtained, the usefulness of the information will be higher. For dependable results, the wheel should not rotate more than 5 degrees from the time at which the first value is obtained to the time at which the last value is obtained.

In the field of railway technology, all components of the force and moment occurring at the contact point between the wheel and the rail are of interest to measure. The quotient between the lateral component of the force (perpendicular to the rail) and the vertical component is considered to be a measure of the risks of de-railing. The longitudinal component (along the rail) shows accelerating and breaking forces.

Two moment components are present: around the longitudinal axis and around the vertical axis. The moment around the longitudinal axis is a measure of the lateral position of the contact point between the wheel and rail, which is of interest in the study of running dynamics. The moment around the vertical axis can be used to detect two-point contact between the wheel and the rail.

The concept and wording "wheel angle" herein means the angular position of the contact point between wheel and rail, given in a coordinates system fixed on the wheel.

As pointed out above, determining the wheel angle is an important step in the method described herein. The wheel angle can be determined in several different ways.

One way to determine the wheel angle is to use an external sensor. For example, a non-rotating optical sensor together with an optical reflector mounted on the wheel or wheel axle can be used to determine the frequency and phase of wheel rotation. Alternatively, the axle can be equipped with strain gauges and the wheel angle can be computed from the strain measured at the axle.

With the present invention, it is advantageous if the wheel angle can be computed using only the signals measured by the sensors already in place to carry out the inventive method. Preferably, all sensors are placed on one side of a wheel disc. If the angular position of the wheel is computed from measurements taken by an external sensor, both the signals from the wheel and the signal from the external sensor must be transferred to the same location before the loads can be computed. If, on the other hand, the wheel angle can be computed from the information obtained by the wheel sensors, it is possible that the necessary computations can be made on the wheel disc, presuming a suitably powerful processor can be placed on the wheel. According to an embodiment of the invention, the digital signal processor $2b$ (FIG. 3) is a suitably powerful processor to perform computation of the wheel angle. An advantageous effect of this embodiment is that the only data which needs pass through the narrow confines of the radio communications or transfer system are the processed signals. This means the number of sensors and the sensor sampling rate are not limited by bandwidth in the transfer system.

Different methods can be used when relying on the discussed existing sensor signals to also determine angular position. For example, if the wheel is rolling on a rail, the signal of a radially-oriented sensor indicates minimum strain when the wheel is in the angular position where that sensor is physically closest to the rail. In this moment, the sensor and the contact point between wheel and rail have the same angular coordinate. Therefore, wheel angle can be estimated by registering the frequency and phase with which the value from a chosen sensor passes minimum strain.

However, it is preferred to use the minimization method, the explanation of which is to be found in the discussion of equations 8 and 9 above.

Figure 4:
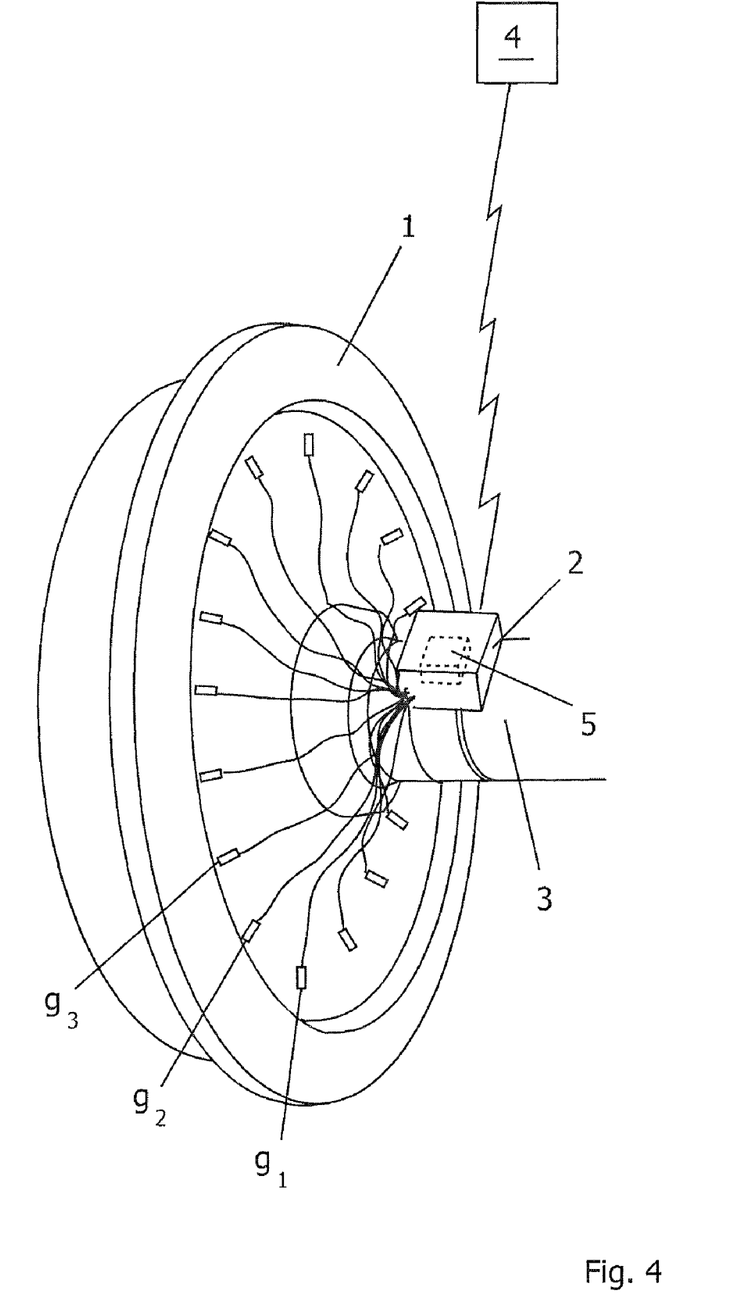
FIG. 4 shows schematically, with a hidden part indicated with broken lines, a train wheel and a part of an axle therefore, and a system for determining a plurality of load components, according to an alternative embodiment of the invention.

Although FIGS. 1 and 4 show embodiments where the sensors are provided on one side of the wheel disc, it is to be noted that according to another embodiment of the invention the sensors $g_j$ are integrated in the wheel disc.

It is preferred that at least some of the sensors are connected to an electrical device on a part of the vehicle that is rigidly connected to the wheel where they are placed, for example the wheel axle. The electrical device can comprise a radio unit, the method thereby comprising the step of transmitting information based at least in part on the sensor values to a radio receiver.

Subtraction of Signals from Sensors on the Wheel Placed on Opposite Sides of the Wheel Axle In most applications, the loads that are most interesting to register are the forces occurring due to contact between the wheel and rail. All strain field components caused by other loads are interference. Interference includes e.g. centrifugal force, rotationally symmetric temperature differences, for example, a hot hub or hot running circle when the rest of the wheel is cooled by the wind, and vibrations in the wheel disc, especially the eigenmodes of vibrations.

Centrifugal force and rotationally symmetric temperature differences are rotationally symmetric and the variations in strain fields they cause are of very low frequency compared to the rotation of the wheel. This low frequency allows elimination of their influence by high pass filtering. Another way of handling them is by introducing the strain field shapes they represent into the B matrix. Where all sensors are placed in a circle with centre on the wheel centre in the same orientation relative to the centre, the strain field shape they measure has the same value for all sensors.

Figure 8:
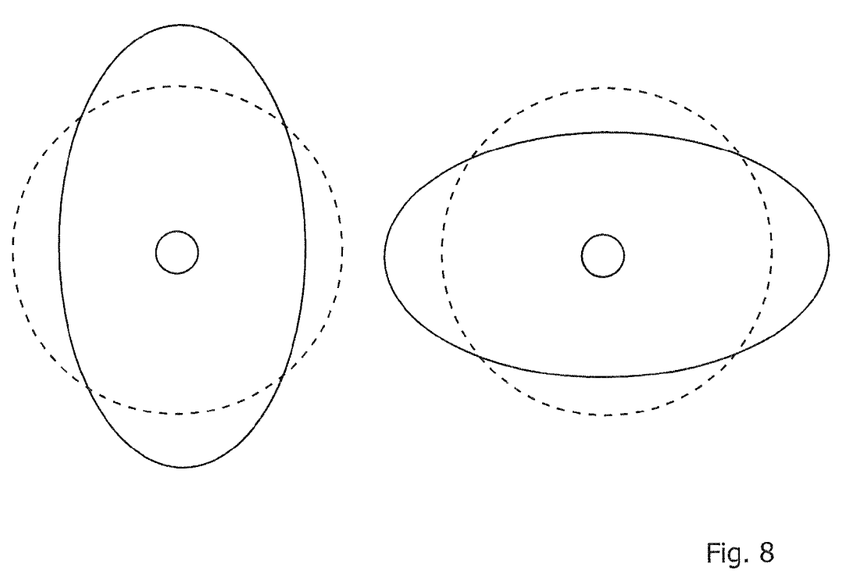
FIG. 8 illustrates a vibration pattern of an eigenmode of vibration in a train wheel.

The most important eigenmode of vibration in a train wheel has a vibration pattern similar to the one shown in FIG. 8 with emphasis. When plotted against wheel angle it is similar to a sine wave with 2 wavelengths per lap for many wheels. The time frequency of the vibrations is significantly higher than the frequency of loads usually measured, which means their influence can be removed by low pass filtering. If loads are to be measured in high frequencies, though, the effect of vibrations cannot be removed by filtering, but must be included in the B matrix In contrast to the strain fields from force loads, the strain fields of the eigenmodes of vibration have no predictable orientation relative to the wheel angle. This can make inclusion in the B matrix difficult since one strainvector per possible orientation angle of the eigenmode (i.e. in theory infinitely many) would have to be introduced. When the eigenmodes have the above-described shape of sinusoids over the lap, though, and they often have, it is enough to include two vectors per eigenmode. A sinusoid of any phase can be expressed as the sum of a sine wave and a cosine wave. Therefore, if one sine and one cosine wave are included into the B matrix, each such eigenmode will be captured, separated from the other loads, and possible to recognize.

As the transmission from the wheel can be a bottleneck of the method, it is desirable to reduce signal strength before the radio link as much as possible without destroying valuable information. The rotationally symmetric load cases in particular can cause high strain values compared to those caused by the searched loads, and eliminating that portion of sensor output before the radio link is preferred. Also, if the number of signals necessary to send over the narrow confines of the link can somehow be reduced, this too is desirable.

According to a preferred embodiment of the invention the signals from sensors placed opposite each other across the wheel disc are subtracted from each other. According to one version of this embodiment this subtraction operation is performed by the processor 2b (see FIG. 3), which is placed on the wheel. Hence this subtraction can be made before transmitting signals over the radio link, thereby significantly decreasing the number of signals that need to be sent over the radio link. According to another version of this embodiment this subtraction operation is performed by the computation device 5, placed downstream from the radio link, as shown in FIG. 1.

All effects of the symmetric load cases and the eigenmodes of vibration described above are eliminated if the sensors in the pair are placed exactly symmetrical on a perfectly homogenous wheel. The effects are significantly reduced when these criteria are only approximately fulfilled. This applies for any signal with an even number of wavelengths around the wheel lap. If for example there would be eigenmodes of vibration that do not have the above described sinusoid shape over the lap, they are still likely to have an even number of wavelengths spatially over the wheel lap, and would therefore be eliminated through this method.

Figure 9:
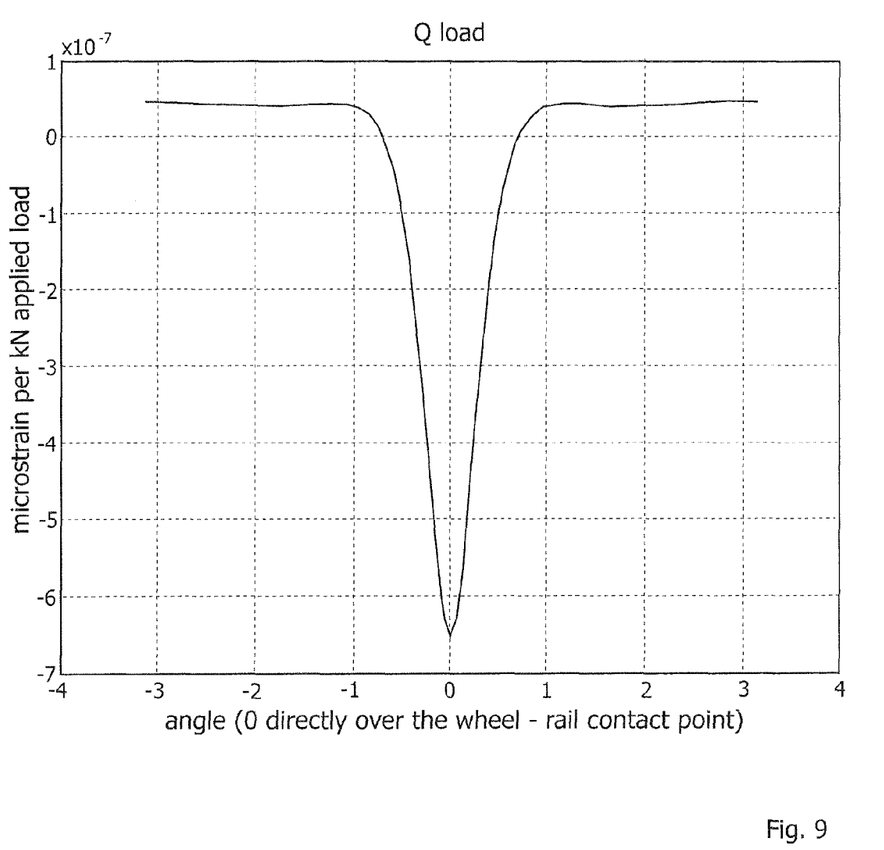
FIG. 9 shows the sensor output from a single sensor as the wheel rotates one lap with pure Q load applied to the running point.

The information from the loads attacking the wheel in the contact point is not significantly affected by the subtraction. FIG. 9 shows the sensor output from a single sensor as the wheel rotates one lap with pure Q load applied to the running point.

Figure 10:
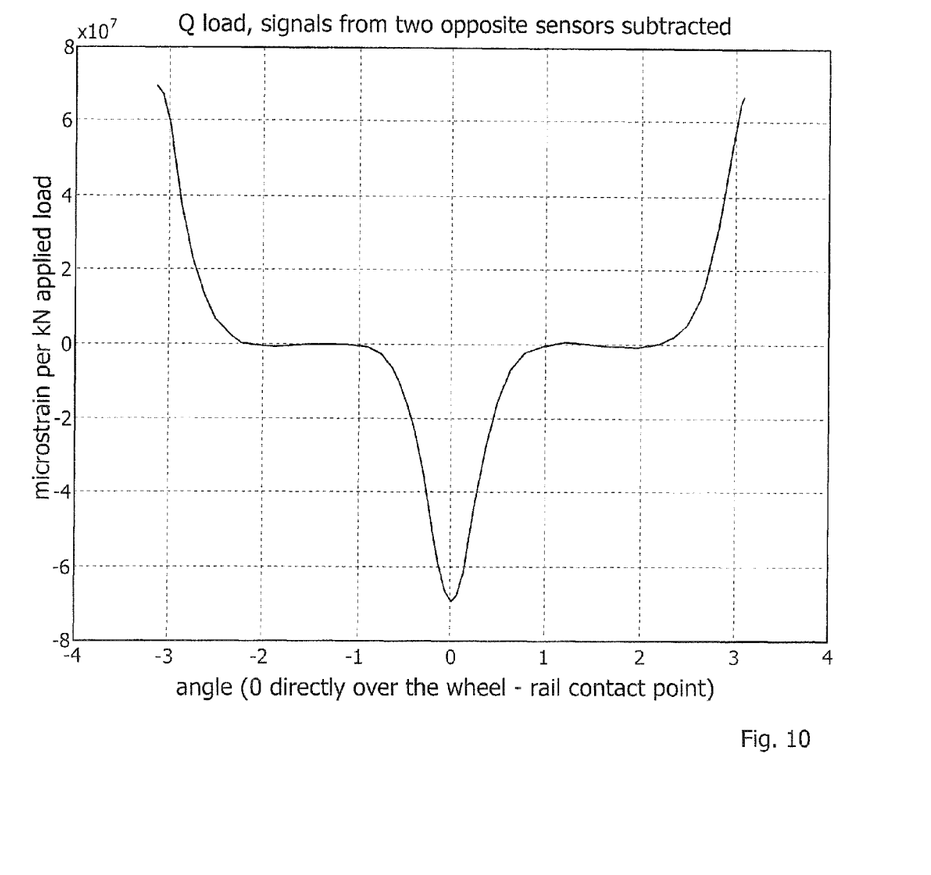
FIG. 10 shows the difference between the output from this sensor and the sensor placed directly opposite it as the wheel rotates one lap with pure Q load applied to the running point.

FIG. 10 shows the difference between the output from this sensor and the sensor placed directly opposite it as the wheel rotates one lap with pure Q load applied to the running point. The inventors realized that it seems visually plausible from the graphs that little information is lost in the operation, and by performing the computation the inventors proved that to be true. In many cases, the vector lengths of the rows in the matrix B are nearly the same as before the subtraction, which means only a slight increment in noise.

Finding the Wheel Frequency Before Searching the Angular Position of the Wheel—Rail Contact Point When significant noise is present in the sensors' signals, the estimation of the wheel angle from a single time instance is likely to be erroneous. The disturbances can coincidentally modify the signals so that they appear to indicate a different angle and strain field, for which the resulting error estimate (calculated as described above) is smaller than when calculated based on the correct angle. Further, even when the angular position can be accurately computed at each time instance, it may be too time-consuming to perform the estimation from scratch each time, and an initial estimate may be needed.

According to an embodiment of the invention this problem is solved by performing measurements, e.g. by collecting signal samples, during a period of time, and by using the collected signal samples for determining both the frequency of wheel rotation, and for determining relevant wheel positions. This measurement time period may be a short time period, for example one second. During the measurement time period the sampling may be repeated with a certain sampling frequency so as to obtain a series of momentary "images" of the strain field in the wheel. Hence, this series of collected signal samples represents a temporal progression of strain field in the wheel during the measurement time period.

The signal samples collected during such a measurement time period are used for determining the frequency of the wheel rotation, and for determining relevant wheel positions. According to a preferred embodiment, the frequency of the wheel rotation is first determined based on the collected signal samples, and thereafter this wheel rotation frequency information is used in combination with the collected signal samples in the process of determining wheel positions related to the same collected signal samples. In this manner it is possible to achieve a more accurate determination of the angular wheel position. For example, when the wheel rolls at a constant speed of rotation, and the wheel rotation frequency is sufficiently high to allow for plural revolutions during the measurement time period, then the same angular wheel position will have been passed plural times. This fact can be used in a process of creating average values so as to reduce the influence of noise, thereby increasing the accuracy of the determination of the angular wheel position. More specifically, this can be done in the following way: signal samples for all time instances occurring when the wheel angle is approximately the same (i.e., the wheel rotation has approximately the same phase) can be averaged to form fewer, less noisy, strain vectors. The expected shift of the wheel angle between these strain vectors is known so when the wheel angle has been estimated for each strain vector, the results can be combined and the error reduced even more.

Reducing the number of strain vectors as described above offers a way to find an initial estimate of the angles for each time instance when the signals are sufficiently clear so that the angle could have been deduced for each time instance without error. Thus, the method saves computation time.

The frequency can be deduced from the signals in several ways. For example, a frequency analysis such as Fourier can be applied to the output from a single channel. Alternately, the frequency analysis can be made on a signal that combines output from all measured channels into one signal. Using data from all sensors makes the signal less sensitive to disturbances in a single sensor.

A suitable way of combining sensor outputs from all sensors is to make a linear combination of the outputs. Nearly any combination will suffice, but the preferred signal for analysis is the result of adding the signals from about half the sensors to each other and then subtract the signals from the rest of the sensors from this sum. For example, the signal that is the sum of all outputs from sensors placed on half the lap of the wheel can be subtracted from the sum of the signals form all other sensors to give a signal that is distinctly periodic and less sensitive to interference than the signal from any single sensor.

An aspect of the invention relates to a method for determining a plurality of load components $F_i$ on a wheel, comprising the steps of
 providing on the wheel a plurality of sensors $g_j$ with which it is possible to detect strains or stresses, and
 measuring essentially simultaneously sensor values $\epsilon_j$ of at least some of the sensors $g_j$. The method is characterised in that:
 the number of sensors $g_j$, sensor values $\epsilon_j$ of which are measured essentially simultaneously, is at least three,
 and in that the method comprises the step of
  determining a plurality of load components $F_i$ at least partly based on the measured sensor values $\epsilon_j$.

An aspect of the invention relates to a method, in which at least some of the sensors are connected to an electrical device 2 on a part of the vehicle that is rigidly connected to the wheel where the sensors are placed, for example the wheel axle, the electrical device 2 comprising a radio unit 2c, the method comprising the step of transmitting information at least partly based on the sensor values to a radio receiver 4.

An aspect of the invention relates to a system, wherein signals from sensors placed opposite each other across the circle are subtracted from each other.

An aspect of the invention relates to a system, wherein a frequency of the wheel rotation is determined during a period of time before an angular position of the wheel is determined.

An aspect of the invention relates to a method comprising the step of: subtracting signals from sensors placed opposite each other across the circle from each other.

An aspect of the invention relates to a method, comprising the step of
 determining a frequency of the wheel rotation during a period of time before an angular position of the wheel is determined.

An aspect of the invention relates to a method for determining a plurality of load components $F_i$ on a wheel, comprising the steps of
 providing a plurality of sensors $g_j$ with which it is possible to detect strains or stresses, wherein at least one of the sensors are provided within the wheel (meaning not on the surface of the wheel)
 and
 measuring essentially simultaneously sensor values $\epsilon_j$ of at least some of the sensors $g_j$. The method is characterised in that
 the number of sensors $g_j$, sensor values $\epsilon_j$ of which are measured essentially simultaneously, is at least three,
 and in that the method comprises the step of determining a plurality of load components $F_i$ at least partly based on the measured sensor values $\epsilon_j$.

The invention claimed is:

1. A method for determining a plurality of load components ($F_i$) on a wheel, comprising:
 providing on the wheel a plurality of sensors ($g_j$) with which it is possible to detect strains or stresses in said wheel;
 measuring essentially simultaneously a plurality of sensor values ($\epsilon_j$) of at least some of the sensors ($g_j$), the number of sensors ($g_j$), sensor values ($\epsilon_j$) of which are measured essentially simultaneously, being at least three; and
 determining a plurality of load components ($F_i$) at least partly based on the measured sensor values ($\epsilon_j$), wherein the method is adapted to be performed on a train wheel, and wherein the method is adapted to determine said plurality of load components so that said determined load components are load components ($F_i$) acting on the train wheel at a contact point between the train wheel and a rail, wherein:
  a load component vector (F) comprises said load components ($F_i$);
  a sensor value vector ($\epsilon$) comprises said measured sensor values ($\epsilon_j$) which are dependent on a train wheel angular position;
  the step of determining the plurality of load components ($F_i$) comprises the solving of an equation system which involves determining a load component determination matrix (B) such that said load component vector (F) equals or is approximated by the product of the load component determination matrix (B) and said sensor value vector ($\epsilon$); and
  said plurality of sensor values ($\epsilon_j$) is a larger number than said plurality of load components ($F_i$) so that said equation system is overdetermined.

2. A method according to claim 1, where the load component determination matrix (B) is chosen so that F −B$\epsilon$ is the least-squares solution to the over-determined linear equations system of $\epsilon$=AF, where the matrix A contains sensor values related to individual load components.

3. A method according to claim 1, comprising determining, at least partly on the basis of the measured sensor values ($\epsilon_j$), the wheel angle ($\phi$) at which the step of measuring the sensor values ($\epsilon_j$) was taken.

4. A method according to claim 1, in which the number of sensors, sensor values ($\epsilon_j$) of which are measured essentially simultaneously, is at least eight.

5. A method according to claim 1, in which all sensors ($g_j$) are provided on the same side of the wheel.

6. A method according to claim 1, in which at least one sensor ($g_j$) comprises two sensor elements ($g_j a, g_j b$), whereby one sensor element ($g_j a$) is oriented in the radial direction of the wheel, and the other ($g_j b$) is oriented in the circumferential direction.

7. A method according to claim 1, in which at least some of the sensors are provided along a circle, the centre of which essentially coincides with the wheel center.

8. A method according to claim 1, in which at least some of the sensors are connected to an electrical device at the wheel axle, the electrical device comprising a radio unit, the method comprising transmitting information at least partly based on the sensor values to a radio receiver.

9. A system for determining a plurality of load components ($F_i$) on a wheel, comprising, on the wheel, a plurality of sensors ($g_j$) with which it is possible to detect strains or stresses in said wheel, the system being adapted to measure essentially simultaneously a plurality of sensor values ($\epsilon_j$) of at least some of the sensors ($g_j$) wherein the number of sensors ($g_j$), sensor values ($\epsilon_j$) of which are measured essentially simultaneously, is at least three, and wherein the system is adapted to determine a plurality of load components ($F_i$) at least partly based on the measured sensor values ($\epsilon_j$), and wherein said wheel is a train wheel, and the system is adapted to determine said plurality of load components ($F_i$) so that said determined load components are load components ($F_i$) acting on the train wheel at a contact point between the train wheel and a rail, wherein:
- a load component vector (F) comprises said load components ($F_i$);
- a sensor value vector ($\epsilon$) comprises said measured sensor values ($\epsilon j$) which are dependent on a train wheel angular position;
- the system is adapted to determine the plurality of load components ($F_i$) by the solving of an equation system which involves determining a load component determination matrix (B) such that said load component vector (F) equals or is approximated by the product of the load component determination matrix (B) and said sensor value vector ($\epsilon$); and
- said plurality of sensor values ($\epsilon_j$) is a larger number than said plurality of load components ($F_i$) so that said equation system is overdetermined.

10. A system according to claim 9, adapted to choose the load component determination matrix (B) so that $F = B\epsilon$ is the least-squares solution to the over-determined linear equations system of $\epsilon = AF$, where the matrix A contains sensor values related to individual load components.

11. A system according to claim 9, adapted to determine, at least partly on the basis of the measured sensor values ($\epsilon_j$), the wheel angle ($\phi$) at which the step of measuring the sensor values ($\epsilon_j$) was taken.

12. A system according to claim 9, wherein the number of sensors, sensor values ($\epsilon j$) of which are measured essentially simultaneously, is at least eight.

13. A system according to claim 9, wherein all sensors ($g_j$) are provided on the same side of the wheel.

14. A system according to claim 9, wherein at least one sensor ($g_j$) comprises two sensor elements ($g_ja$, $g_jb$), whereby one sensor element ($g_ja$) is oriented in the radial direction of the wheel, and the other ($g_jb$) is oriented in the circumferential direction.

15. A system according to claim 9, wherein at least some of the sensors are provided along a circle, the centre of which essentially coincides with the wheel center.

16. A system according to claim 9, wherein at least some of the sensors are connected to an electrical device at the wheel axle, the electrical device comprising a radio unit, adapted to transmit information at least partly based on the sensor values to a radio receiver.

17. A system according to claim 9, wherein at least some of the sensors are connected to an electrical device on a part of the vehicle that is rigidly connected to the wheel where the sensors are placed, the electrical device comprising a radio unit, adapted to transmit information at least partly based on the sensor values to a radio receiver.

18. A system according to claim 15, wherein signals from sensors placed opposite each other across the circle are subtracted from each other.

19. A method according to claim 1, in which at least some of the sensors are connected to an electrical device on a part of the vehicle that is rigidly connected to the wheel where the sensors are placed, the electrical device comprising a radio unit, the method comprising transmitting information at least partly based on the sensor values to a radio receiver.

20. A method according to claim 7, wherein the method comprises subtracting signals from sensors placed opposite each other across the circle from each other.

21. A method according to claim 1, further comprising determining a frequency of the wheel rotation before an angular position of the wheel is determined.

22. A method according to claim 1, wherein the necessary computations are performed by a processor which is placed on the wheel or on the wheel axle.

23. A system according to claim 9, comprising a processor which is placed on the wheel or on the wheel axle; said processor being coupled to said sensors; wherein the processor is adapted to perform the necessary computations.

24. A method for determining a plurality of load components on a wheel, comprising:
- providing on the wheel a plurality of sensors with which it is possible to detect strains or stresses;
- measuring essentially simultaneously sensor values of at least some of the sensors, wherein the number of sensors, sensor values of which are measured essentially simultaneously, is at least three;
- determining a plurality of load components at least partly based on the measured sensor values; and
- determining, at least partly on the basis of the measured sensor values ($\epsilon_j$), the wheel angle ($\phi$) at which the step of measuring the sensor values ($\epsilon_j$) was taken, wherein the system is adapted to determine the wheel angle ($\phi$) as the value that minimizes the expression $|\epsilon - A*B*\epsilon|$, wherein A is a sensor value determination matrix with sensor calibration values ($A_{ji}$), and wherein B is a load component determination matrix.

25. A system for determining a plurality of load components ($F_i$) on a wheel, comprising, on the wheel, a plurality of sensors ($g_j$) with which it is possible to detect strains or stresses, the system being adapted to measure essentially simultaneously sensor values ($\epsilon_j$) of at least some of the sensors ($g_j$), wherein the number of sensors ($g_j$), sensor values ($\epsilon_j$) of which are measured essentially simultaneously, is at least three, and wherein the system is adapted to determine a plurality of load components ($F_1$) at least partly based on the measured sensor values ($\epsilon_j$), the system being adapted to determine, at least partly on the basis of the measured sensor values ($\epsilon_j$), the wheel angle ($\phi$) at which the step of measuring the sensor values ($\epsilon_j$) was taken, wherein the system is adapted to determine the wheel angle ($\phi$) as the value that minimizes the expression $|\epsilon - A*B*\epsilon|$, wherein A is a sensor value determination matrix with sensor calibration values ($A_{ji}$), and wherein B is a load component determination matrix.

26. A system for determining a plurality of load components ($F_i$) on a wheel, comprising, on the wheel, a plurality of sensors ($g_j$) with which it is possible to detect strains or stresses, the system being adapted to measure essentially simultaneously sensor values ($\epsilon_j$) of at least some of the sensors ($g_j$), wherein the number of sensors ($g_j$), sensor values ($\epsilon_j$) of which are measured essentially simultaneously, is at least three, and wherein the system is adapted to determine a plurality of load components ($F_i$) at least partly based on the measured sensor values ($\epsilon_j$), wherein the system is arranged to:
- collect sensor values during a period of time;
- use the collected sensor values for determining the frequency of the wheel rotation; and use the wheel rotation frequency information in combination with the collected sensor values in the process of determining at least one angular wheel position.

27. A method for determining a plurality of load components on a wheel, comprising:

providing on the wheel a plurality of sensors with which it is possible to detect strains or stresses;

measuring essentially simultaneously sensor values of at least some of the sensors, wherein the number of sensors, sensor values of which are measured essentially simultaneously, is at least three;

determining a plurality of load components at least partly based on the measured sensor values;

determining a frequency of the wheel rotation before an angular position of the wheel is determined;

collecting sensor values during a period of time, and using the collected sensor values for determining the frequency of the wheel rotation; and using the wheel rotation frequency information in combination with the collected sensor values for determining at least one angular wheel position.

* * * * *